US010970278B2

(12) United States Patent
Yan et al.

(10) Patent No.: US 10,970,278 B2
(45) Date of Patent: *Apr. 6, 2021

(54) QUERYING KNOWLEDGE GRAPH WITH NATURAL LANGUAGE INPUT

(71) Applicant: Microsoft Technology Licensing, LLC, Redmond, WA (US)

(72) Inventors: Rui Yan, Bellevue, WA (US); Yonggang Deng, Bellevue, WA (US); Junyi Chai, Bellevue, WA (US); Maochen Guan, Seattle, WA (US); Yujie He, Bellevue, WA (US); Bing Li, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/370,721

(22) Filed: Mar. 29, 2019

(65) Prior Publication Data

US 2020/0311070 A1 Oct. 1, 2020

(51) Int. Cl.
*G06F 40/30* (2020.01)
*G10L 15/19* (2013.01)
(Continued)

(52) U.S. Cl.
CPC ...... *G06F 16/24522* (2019.01); *G06F 40/284* (2020.01); *G06F 40/295* (2020.01); *G06F 40/30* (2020.01); *G06N 20/00* (2019.01)

(58) Field of Classification Search
CPC ................................ G06F 40/30; G10L 15/19
See application file for complete search history.

(56) References Cited

U.S. PATENT DOCUMENTS 8,977,953 B1 * 3/2015 Pierre .................... G06F 16/38
715/230
10,339,420 B1 7/2019 Lecue et al.
(Continued)

FOREIGN PATENT DOCUMENTS

EP 2757510 A1 7/2014

OTHER PUBLICATIONS

Gupta, et al., "An Efficient Approach to Encoding Context for Spoken Language Understanding", In Repository of arXiv:1807.00267, Jul. 1, 2018, 5 Pages.
(Continued)

*Primary Examiner* — Shreyans A Patel
(74) *Attorney, Agent, or Firm* — Alleman Hall Creasman & Tuttle LLP

(57) ABSTRACT

A server computing device, including memory storing a knowledge graph. The server computing device may further include a processor configured to receive a natural language input and generate a tokenized utterance based on the natural language input. Based on the tokenized utterance, the processor may select a predefined intention indicating a target ontology entity type of the natural language input. The processor may identify at least one input ontology entity token included in the tokenized utterance and may identify at least one relation between the predefined intention and the input ontology entity token. Based on the predefined intention, the at least one input ontology entity token, and the relation, the processor may generate a structured query. Based on the structured query and the knowledge graph, the processor may output an output ontology entity token having the target ontology entity type.

20 Claims, 14 Drawing Sheets

(51) Int. Cl.

| | |
|---|---|
| ***G06F 16/2452*** | (2019.01) |
| ***G06N 20/00*** | (2019.01) |
| ***G06F 40/284*** | (2020.01) |
| ***G06F 40/295*** | (2020.01) |

(56) References Cited

U.S. PATENT DOCUMENTS

| | | | | |
|---|---|---|---|---|
| 10,528,871 | B1* | 1/2020 | Gramatica | G06F 16/903 |
| 2013/0226846 | A1 | 8/2013 | Li et al. | |
| 2015/0142704 | A1 | 5/2015 | London | |
| 2015/0227845 | A1* | 8/2015 | Hakkani-Tur | G06F 40/30 706/52 |
| 2015/0370787 | A1* | 12/2015 | Akbacak | G06F 40/44 704/2 |
| 2017/0024465 | A1 | 1/2017 | Yeh et al. | |
| 2017/0278514 | A1 | 9/2017 | Mathias et al. | |
| 2018/0197104 | A1 | 7/2018 | Marin et al. | |
| 2018/0225375 | A1 | 8/2018 | Collins et al. | |
| 2018/0232443 | A1 | 8/2018 | Delgo et al. | |
| 2019/0034540 | A1* | 1/2019 | Perkins | G06F 16/2228 |
| 2019/0042988 | A1 | 2/2019 | Brown et al. | |
| 2019/0057145 | A1 | 2/2019 | Huang et al. | |
| 2019/0065627 | A1 | 2/2019 | De Mel et al. | |
| 2019/0156206 | A1* | 5/2019 | Graham | G06N 3/0454 |
| 2019/0156210 | A1* | 5/2019 | He | G06N 3/0418 |
| 2019/0163835 | A1 | 5/2019 | Scheideler et al. | |
| 2019/0327331 | A1* | 10/2019 | Natarajan | G06K 9/6269 |
| 2019/0341040 | A1* | 11/2019 | Kirazci | G10L 13/02 |
| 2020/0057774 | A1 | 2/2020 | Leong et al. | |
| 2020/0311199 | A1 | 10/2020 | Yan et al. | |
| 2020/0312300 | A1 | 10/2020 | Yan et al. | |

OTHER PUBLICATIONS

Jang, et al., "Cross-Language Neural Dialog State Tracker for Large Ontologies using Hierarchical Attention", In Proceedings of Transactions on Audio, Speech, and Language Processing vol. 26 , Issue 11, Jul. 2, 2018, pp. 2072-2082.

Kim, et al., "ONENET: Joint Domain, Intent, Slot Prediction for Spoken Language Understanding", In Proceedings of Automatic Speech Recognition and Understanding Workshop, Dec. 16, 2017, pp. 547-553.

"International Search Report and Written Opinion Issued in PCT Application No. PCT/US20/016306", dated May 4, 2020, 11 Pages.

"International Search Report and Written Opinion Issued in PCT Application No. PCT/US20/016307", dated May 26, 2020, 13 Pages.

"International Search Report and Written Opinion Issued in PCT Application No. PCT/US20/016310", dated May 14, 2020, 10 Pages.

Wen, et al., "Jointly Modeling Intent Identification and Slot Filling with Contextual and Hierarchical Information", In thesis submitted to Beijing University of Posts and Telecommunications, Jan. 1, 2018, pp. 3-15.

Kaufmann, et al., "Querix: A Natural Language Interface To Query Ontologies Based On Clarification Dialogs", In proceedings of the 5th International Semantic Web Conference, Nov. 2006, 2 Pages.

Wang, et al., "Panto: A Portable Natural Language Interface to Ontologies", Retrieved from: https://link.springer.com/content/pdf/10.1007/978-3-540-72667-8_34.pdf, Jun. 2007, pp. 473-487.

"Notice of Allowance Issued in U.S. Appl. No. 16/370,759", dated Sep. 30, 2020, 8 Pages.

* cited by examiner

FIG. 5
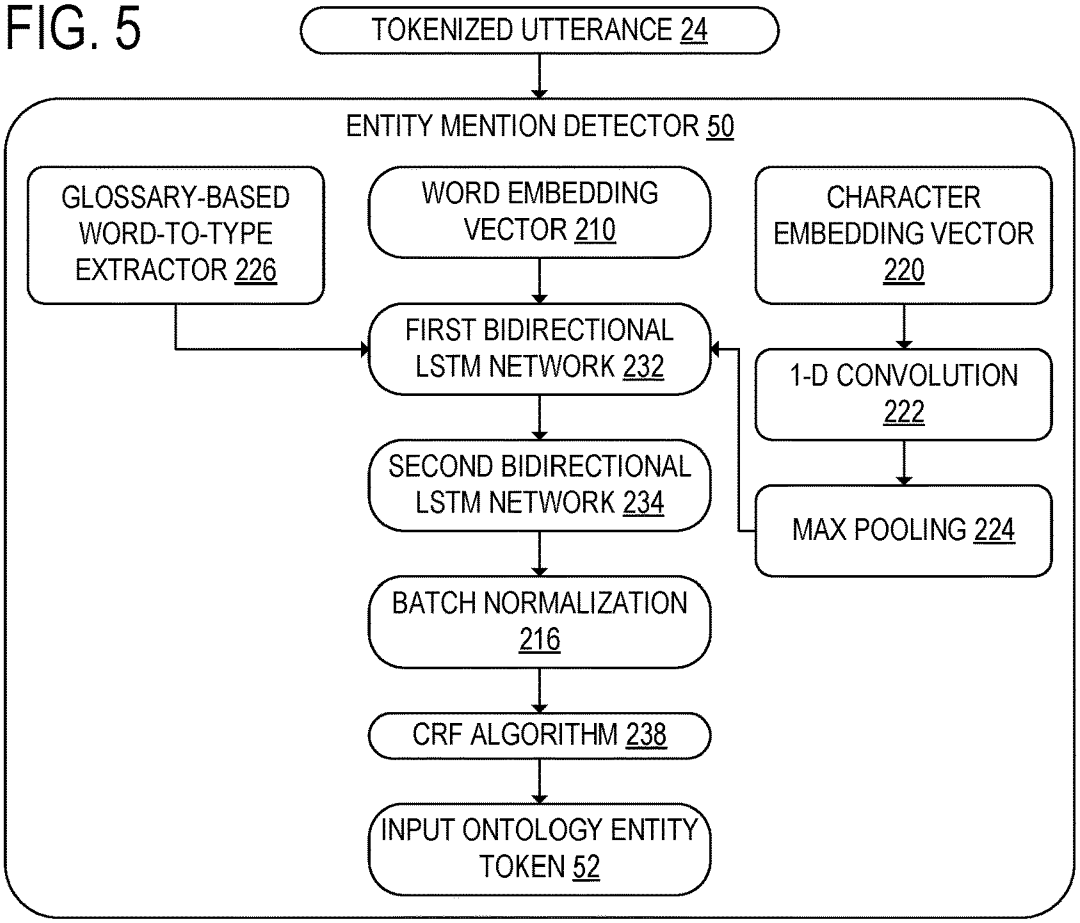
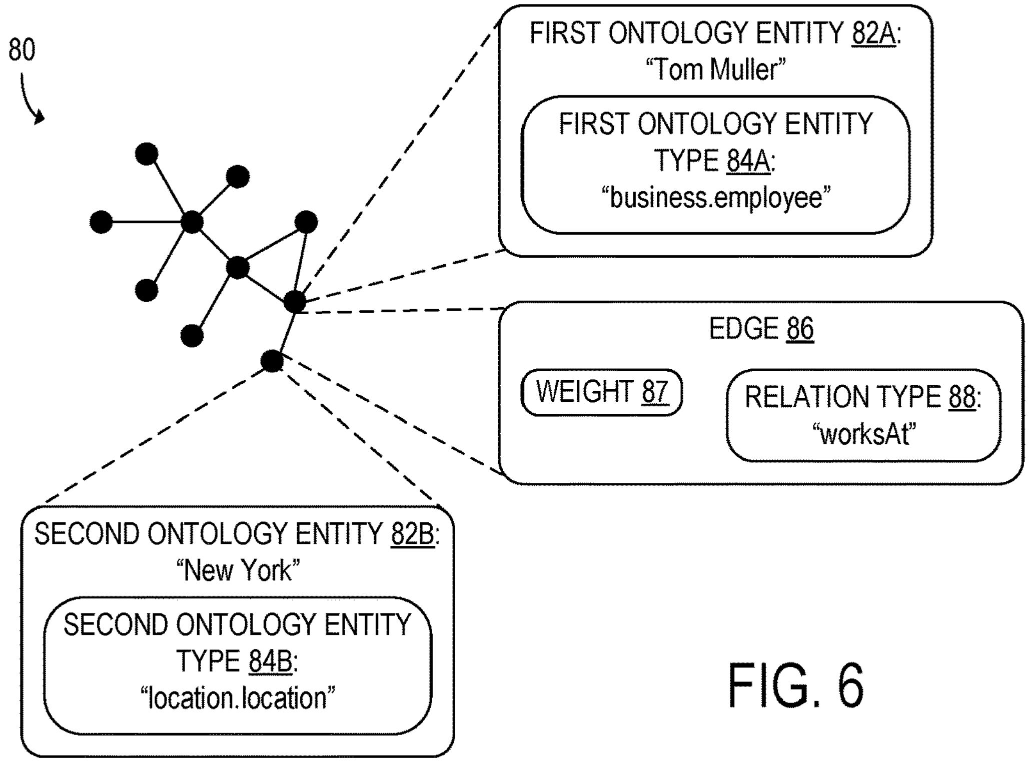
FIG. 6

| PREDEFINED INTENTION 42 | UTTERANCE 322 |
|---|---|
| Find_Projects | What recent <business.client_company> work is there? |
| Find_Experts | Search for experts in <business.skill1> or <business.skill2> |
| Find_Employee | Tell me more about <business.employee> |
| Send_Email | Help me send an email to <business.employee> |
| Show_Timesheet | Complete this week's <timesheet> |
| Show_Digest | Show me my daily digest |
| Show_Calendar | When is <business.employee>'s schedule open on <sysbuiltin.weekday>? |

QUERYING KNOWLEDGE GRAPH WITH NATURAL LANGUAGE INPUT

BACKGROUND

Natural language search engines are used by a wide range of enterprises that work with large amounts of data. Natural language search engines aim to find targeted answers to user questions expressed in natural language rather than in more formalized query languages. Thus, natural language search functionality may allow users without specialized knowledge of query languages to search databases and receive desired search results. Natural language searching may allow the database to be used by a larger number of users and may reduce the amount of time needed to train users of a database. However, existing natural language search engines are typically expensive and time-consuming to customize to meet the needs of specific enterprises.

SUMMARY

According to one aspect of the present disclosure, a server computing device is provided, including memory storing a knowledge graph including a plurality of ontology entities connected by a plurality of edges and having a respective plurality of ontology entity types. The server computing device may further include a processor configured to receive a natural language input. The processor may be further configured to generate a tokenized utterance based on the natural language input. The tokenized utterance may include one or more words and one or more metadata tokens respectively associated with the one or more words. Based on the tokenized utterance, at a machine learning algorithm stack including an intention detector and an entity mention detector, the processor may be further configured to select a predefined intention indicating a target ontology entity type of the natural language input using the intention detector. The processor may be further configured to identify at least one input ontology entity token included in the tokenized utterance using the entity mention detector. At a relation mention detector, the processor may be further configured to identify at least one semantic relation and/or at least one literal relation between the predefined intention and the input ontology entity token. Based on the predefined intention, the at least one input ontology entity token, and the at least one semantic relation and/or literal relation, the processor may be further configured to generate a structured query. Based on the structured query and the knowledge graph, the processor may be further configured to output an output ontology entity token selected from among the plurality of ontology entities included in the knowledge graph and having the target ontology entity type.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows an example entity mention detector, according to the embodiment of FIG. 2.

FIG. 6 shows an example knowledge graph, according to the embodiment of FIG. 2.

FIG. 13 shows an example utterance template, according to the embodiment of FIG. 12.

DETAILED DESCRIPTION

Figure 1:
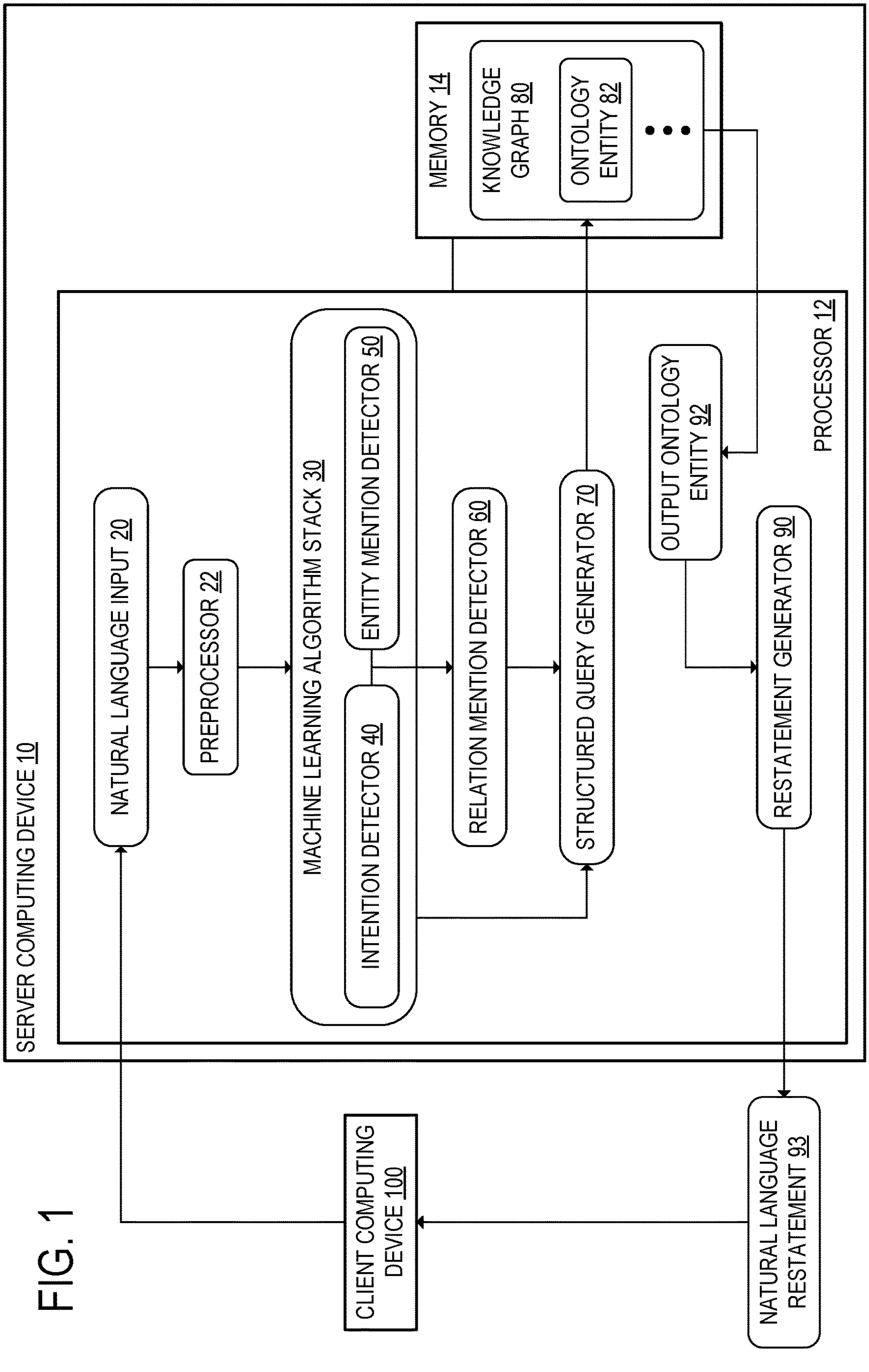
FIG. 1 shows a schematic depiction of an example server computing device, according to one embodiment of the present disclosure.

In order to address the issues discussed above, the inventors have provided a server computing device 10, as shown in FIG. 1 according to one example embodiment. The server computing device 10 may include a processor 12 and/or memory 14, which may be operatively coupled. The server computing device 10 may be configured to communicate with one or more client computing devices 100, from which the server computing device 10 may receive a natural language input 20, as discussed in further detail below. Communication between the server computing device 10 and the one or more client computing devices 100 may occur over a network. In some embodiments, the functions of the server computing device 10 and/or one or more of the components thereof may be distributed across a plurality of communicatively coupled but physically separate computing devices.

The memory 14 of the server computing device 10 may be configured to store a knowledge graph 80, as discussed in further detail below. The knowledge graph 80 may be a database of a plurality of ontology entities 82 connected by a plurality of edges to form a graph. Each ontology entity 82 included in the knowledge graph 80 may be a database entry. When a query of the knowledge graph 80 is performed, the results of the query may be one or more output ontology entity tokens 92 included in the knowledge graph 80.

The processor 12 of the server computing device 10 may be configured to receive a natural language input 20 from the client computing device 100. The natural language input 20 may be selected from the group consisting of audio input and text input. In embodiments in which the natural language input 20 is a speech input, the processor 12 may be configured to covert the speech input to a text input. In some embodiments, the natural language input 20 may include both speech and text. The natural language input 20 may additionally or alternatively include other forms of input, such as one or more images. Using the systems and methods discussed below, the processor 12 may determine an output ontology entity token 92 and output a natural language restatement 93 based on the output ontology entity token 92. Thus, the server computing device 10 may respond to the natural language input 20 with an output expressed in natural language. This may allow a user to quickly and easily make a database query.

The processor 12 may be further configured to input the natural language input 20, in the form of a text input, into a preprocessor 22. The preprocessor 22 may be configured to generate a tokenized utterance 24 based on the natural language input 20, as shown in FIG. 2A. The tokenized utterance 24 may include one or more words 25 and one or more metadata tokens 26 respectively associated with the one or more words 25. Each metadata token 26 may include information such as one or more letter cases (uppercase or lowercase) and/or one or more part-of-speech tags respectively associated with its respective word. The one or more words 25 included in the tokenized utterance 24 may each include one or more characters. Each word 25 of the one or more words 25 may be represented as a vector when performing intention detection and/or entity mention detection, as discussed in further detail with reference to FIGS. 4 and 5.

The tokenized utterance 24 may further include one or more punctuation marks 27. In embodiments in which the natural language input 20 is a text input, the one or more punctuation marks 27 included in the tokenized utterance 24 may match any punctuation marks 27 included in the natural language input 20. In embodiments in which the natural language input 20 is a speech input, the one or more punctuation marks 27 may be reconstructed when the natural language input 20 is converted to a text input. For example, the one or more punctuation marks 27 may be reconstructed by a machine learning algorithm trained as a punctuation classifier.

In some embodiments, the processor 12 may be further configured to determine that the natural language input 20 includes a date and/or a time. In such embodiments, the tokenized utterance 24 may include a date/time indication 29. Since relations involving dates and times may be difficult to recognize using machine learning algorithms trained with user-annotated data, the date/time indication 29 may handled according to rules not used for other types of data, as discussed in further detail below.

Figure 3:
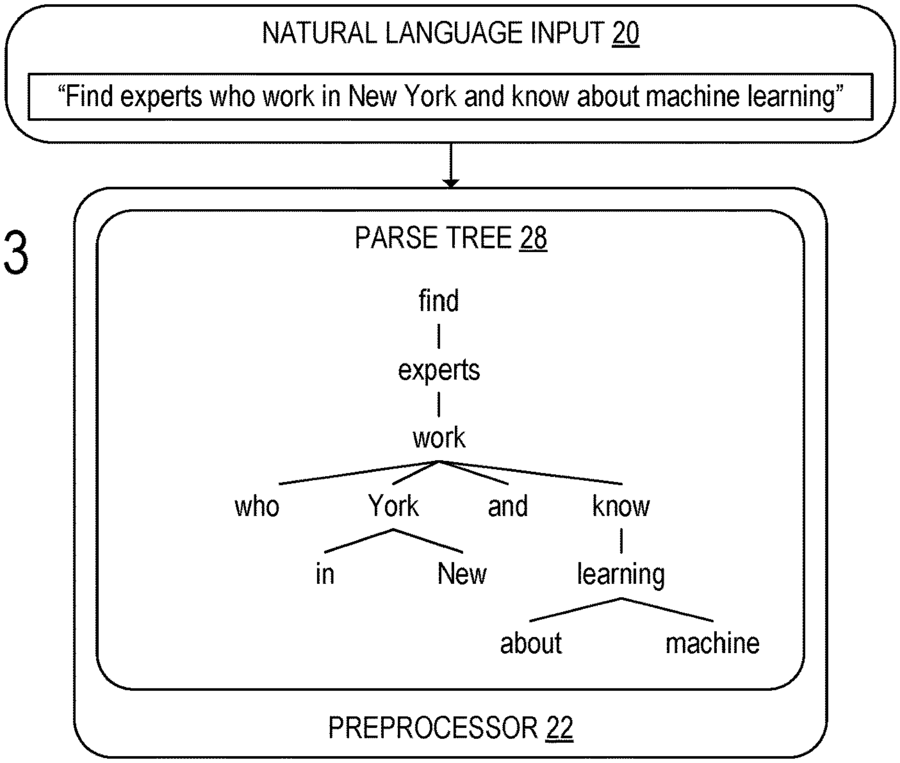
FIG. 3 shows an example parse tree generated by the preprocessor, according to the embodiment of FIG. 2.

In embodiments in which the respective metadata token 26 associated with each word 25 included in the tokenized utterance 24 indicates a part of speech of that word 25, the processor 12 may be further configured to generate a parse tree 28 for the tokenized utterance 24. The parse tree 28 may encode a word dependency structure of the tokenized utterance 24. An example parse tree 28 is shown in FIG. 3. In the example of FIG. 3, the natural language input 20 is the text "Find experts who work in New York and know about machine learning." The preprocessor 22 may generate the parse tree 28 to have a word dependency structure based on the respective parts of speech of the words 25 included in the natural language input 20. In the example of FIG. 3, the predicate "find" is placed at the top of the parse tree 28, the direct object "experts" is placed below "find," and words included in phrases modifying "experts" are placed below "experts."

The processor 12 may be further configured to convey the tokenized utterance 24 to a machine learning algorithm stack 30. The machine learning algorithm stack 30 may include an intention detector 40, an entity mention detector 50, and a relation mention detector 60, each of which is described in further detail below. Each of the intention detector 40, the entity mention detector 50, and the relation mention detector 60 may be a machine learning algorithm.

At the machine learning algorithm stack 30, the processor 12 may determine a target ontology entity type 44 of the natural language input 20 using the intention detector 40. The target ontology entity type 44 is an ontology entity type that the intention detector 40 determines that the response to the natural language input 20 should have. For example, when the natural language input 20 from FIG. 3 is used, the natural language output may have the ontology entity type "person." In some embodiments, the target ontology entity type 44 may be indicated by a predefined intention 42. In such embodiments, a plurality of predefined intentions 42 may be defined by a user prior to training the intention detector 40. The intention detector 40 may be configured to output a predefined intention 42 selected from the plurality of predefined intentions 42 at runtime.

Figure 4:
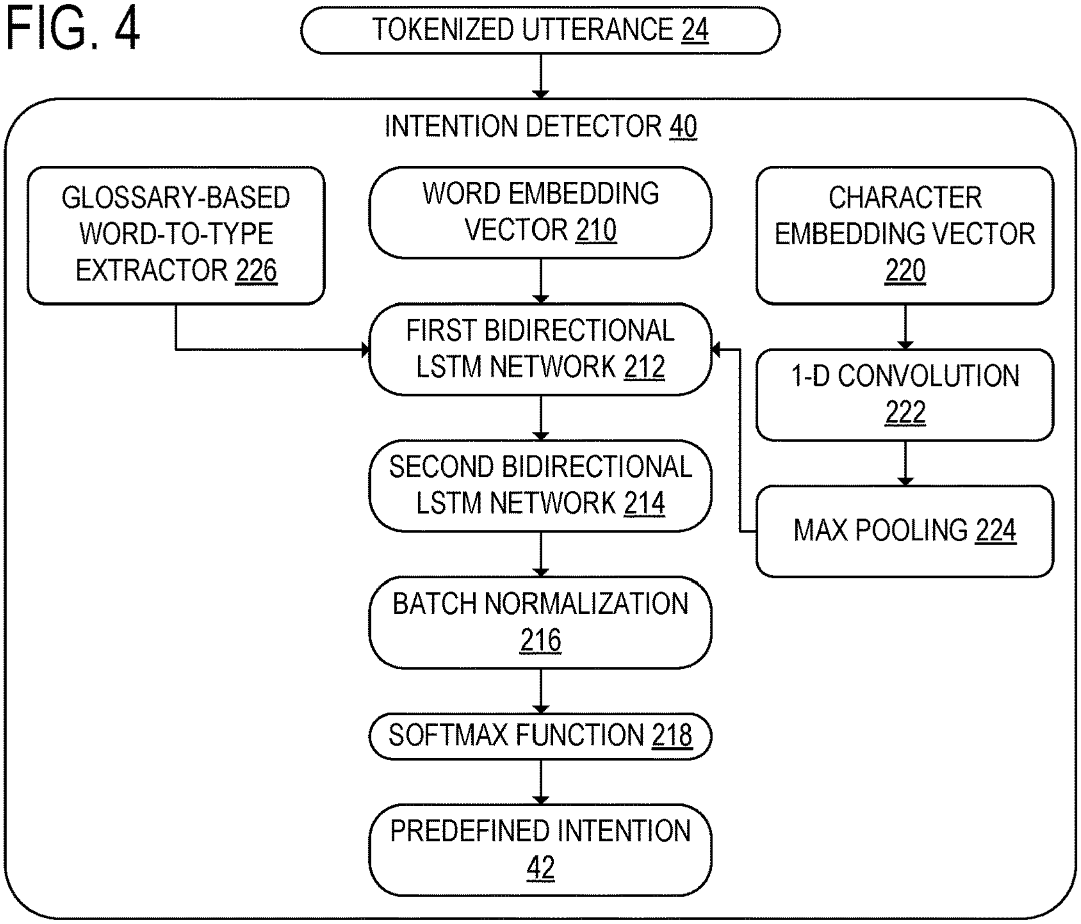
FIG. 4 shows an example intention detector, according to the embodiment of FIG. 2.

FIG. 4 shows an example embodiment of the intention detector 40. As shown in FIG. 4, the intention detector 40 may be configured to receive the tokenized utterance 24 from the preprocessor 22. At the intention detector 40, the processor 12 may be further configured to extract a respective word embedding vector 210 from each word 25 included in the tokenized utterance 24. For example, each word embedding vector 210 may be a 50-dimensional vector, or a vector of another size. In some embodiments, the word embedding vector 210 may be extracted from each word 25 at least in part by applying a word embedding machine learning algorithm to the tokenized utterance 24. For example, the word embedding machine learning algorithm may be a pre-trained Global Vectors for Word Representation (GloVe) algorithm.

In some embodiments, as shown in the example of FIG. 4, the processor 12 may be further configured to implement a glossary-based word-to-type extractor 226 as part of the intention detector 40. The glossary-based word-to-type extractor 226 may use a glossary file based on the knowledge graph 80 to match one or more words 25 to one or more respective ontology entity types 84 associated with the one or more words 25 in the knowledge graph 80. Thus, the processor 12 may determine a respective ontology entity type 84 of each word 25 included in the tokenized utterance 24. As discussed in further detail below with reference to FIG. 12, the glossary file may be generated from the knowledge graph 80 and may be a summary of the knowledge graph 80 including representations of the plurality of ontology entities 82 and/or edges 86.

At the intention detector 40, the processor 12 may be further configured to extract a character embedding vector 220 from each character included in the tokenized utterance 24. For example, each character embedding vector 220 may be a 128-dimensional random character vector. In some embodiments, the processor 12 may be further configured to apply a one-dimensional convolution 222 to each character embedding vector 220. The processor 12 may be further configured to apply an aggregation technique such as max pooling 224 to an output of the 1-D convolution 222.

The processor 12 may be further configured to input the plurality of word embedding vectors 210, the plurality of respective ontology entity types 82 of the words 25 determined at the glossary-based word-to-type extractor 226, and an output of the max pooling 224 into a recurrent neural network. The recurrent neural network may be a first bidirectional long short-term memory (LSTM) network 212. In some embodiments, an output of the first bidirectional LSTM network 212 may be input into a second bidirectional LSTM network 214. In other embodiments, other types and/or numbers of recurrent neural networks may be used. Further details regarding training of the first bidirectional LSTM network 212 and/or the second bidirectional LSTM network 214 included in the intention detector 40 are provided below with reference to FIG. 12.

In the embodiment of FIG. 4, the processor 12 may be further configured to perform batch normalization 216 on an output of the second bidirectional LSTM network 214. The processor 12 may be configured to perform batch normalization 216 on an output of one or more other recurrent neural networks when one or more recurrent neural networks other than bidirectional LSTM networks are used instead. The processor 12 may be further configured to apply a softmax function 218 to an output of the batch normalization 216. The predefined intention 42 may be the output of the softmax function 218.

The predefined intention 42 may indicate a target ontology entity type 44 selected from the plurality of ontology entity types 84 of the plurality of ontology entities 82 included in the knowledge graph 80. For example, when the natural language input 20 is "Find me experts in machine learning," the predefined intention 42 may be "Find_Experts." Thus, the intention detector 40 may select a predefined intention 42 that estimates an intention of the user who enters the natural language input 20.

At the machine learning algorithm stack 30, the processor 12 may be further configured to identify at least one input ontology entity token 52 included in the tokenized utterance 24 using the entity mention detector 50. Each input ontology entity token 52 may be a word or phrase included in the tokenized utterance 24. In addition, the processor 12 may further identify an input ontology entity type 54 of the input ontology entity token 52 in some embodiments. For example, when the natural language input 20 is the text "Find experts who work in New York and know about machine learning," as in the example of FIG. 3, the processor 12 may recognize the input ontology entity token 52 "experts" as having the input ontology entity type 54 "business.employee." As another example, the processor 12 may recognize the phrase "machine learning" as an input ontology entity token 52 having the input ontology entity type 54 "business.skill."

FIG. 5 shows an example embodiment of the entity mention detector 50. Similarly to the intention detector 40, the entity mention detector 50 may receive the tokenized utterance 24 as input. In addition, at the entity mention detector 50, the processor 12 may extract a respective word embedding vector 210 from each word 25 included in the tokenized utterance 24. At a glossary-based word-to-type extractor 226, the processor 12 may be further configured to determine an ontology entity type 84 of each word 25 included in the tokenized utterance 24 based on a glossary file. Additionally or alternatively, the processor 12 may be further configured to extract a character embedding vector 220 from each character included in the tokenized utterance 24. In some embodiments may be further configured to apply a 1-D convolution 222 to each character embedding vector 220 and may apply max pooling 224 to an output of the 1-D convolution 222.

The processor 12 may be further configured to input the plurality of word embedding vectors 210, the plurality of ontology entity types 82 determined at the glossary-based word-to-type extractor 226, and the plurality of character embedding vectors 220 (which may be further processed via 1-dimensional convolution 222 and/or max pooling 224, as discussed above) into a recurrent neural network. The recurrent neural network may be a first bidirectional LSTM network 232. In some embodiments, the output of the first bidirectional LSTM 232 may be received by a second bidirectional LSTM 234. Other types and/or numbers of recurrent neural networks may be used in other embodiments. The training of the first bidirectional LSTM network 232 and/or the second bidirectional LSTM network 234 included in the entity mention detector 50 is described in further detail below with reference to FIG. 14.

In the embodiment of FIG. 4, the processor 12 may be further configured to perform batch normalization 216 on an output of the second bidirectional LSTM network 234. The processor 12 may be further configured to apply a conditional random field (CRF) algorithm 238 to an output of the batch normalization 216. The CRF algorithm 238 may allow the entity mention detector 50 to determine each input ontology entity type 54 included in the input ontology entity token 52 based at least in part on context provided by one or more other input ontology entity types 54, thus identifying a self-consistent set of input ontology entity types 54. The input ontology entity token 52 output by the entity mention detector 50 may be the output of the conditional random field algorithm 238 and may be a vector indicating one or more input ontology entity types 54 of the tokenized utterance 24. For example, when the natural language input is the natural language input "Find me experts in machine learning," the input ontology entity token 52 may be (O, O, B-C-business.employee, O, B-edu.field_of_study, I-edu.field_of_study, O). In this example, each element of the vector corresponds to a word 25 or punctuation mark 27 included in the tokenized utterance 24. The input ontology entity token 52 includes input ontology entity types 54 for the word "experts" and the phrase "machine learning."

Returning to FIG. 2, the memory 14 may be configured to store a knowledge graph 80, which may include a plurality of ontology entities 82 connected by a plurality of edges 86. Each ontology entity 82 included in the knowledge graph 80 may have a respective ontology entity type 84. The plurality of edges 86 may connect ontology entities 82 that are likely to be related to each other. Each edge 86 of the knowledge graph 80 may indicate a relation type 88 of the ontology entities 82 which it connects. For example, as shown in FIG. 6, a first ontology entity 82A with the first ontology entity type 84A "business.employee" may be connected to a second ontology entity 82B with a second ontology entity type 84B "location.location" by an edge 86 with the relation type 88 "worksAt" to indicate that the employee Tom Muller works in New York. In the example of FIG. 6, the first ontology entity 82A and the second ontology entity 82B are directly connected by the edge 86. The knowledge graph 80 further includes indirect connections between pairs of ontology entities 82 in which each path between the ontology entities 82 in the pair passes through one or more intervening ontology entities.

In some embodiments, the knowledge graph 80 may be a weighted graph in which each edge 86 has a respective weight 87. The weight 87 of an edge 86 may indicate a transition probability for the two ontology entities 82 connected by the edge 86. In other embodiments, the weights 87 may be encoded in the ontology entities 82 rather than in the edges 86. For example, each weight 87 may be an in-degree weight 87 indicating how many incoming edges 86 that ontology entity 82 has.

Figure 7:
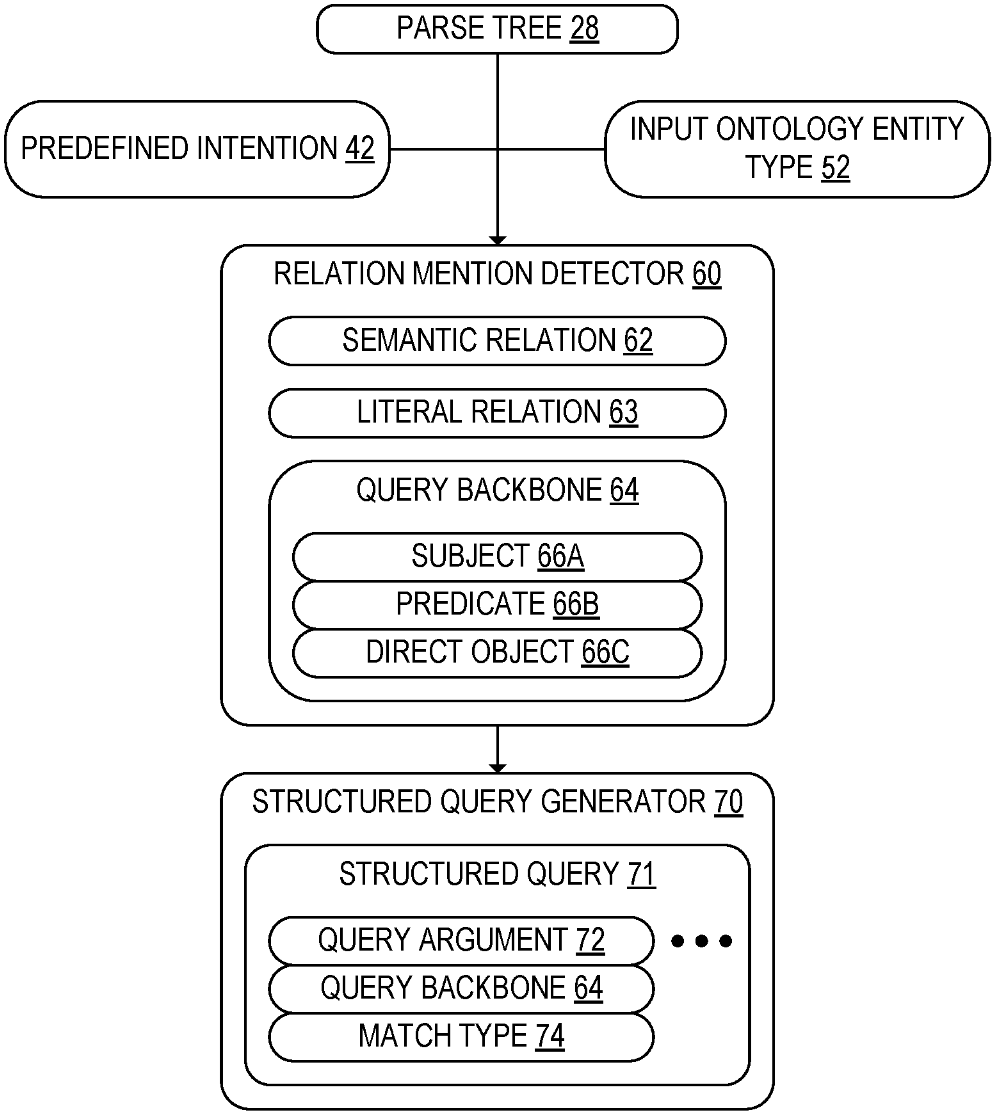
FIG. 7 shows an example relation mention detector, according to the embodiment of FIG. 2.

The processor 12 may be further configured to implement a relation mention detector 60, as shown in FIG. 7. The relation mention detector 60 may be used to identify a semantic relation 62 and/or a literal relation 63 between the predefined intention 42 output by the intention detector 40 and the input ontology entity token 52 output by the entity mention detector 50. At the relation mention detector 60, the processor 12 may be further configured to receive, from the entity mention detector 50, the input ontology entity token 52 associated with the tokenized utterance 24, and may be further configured to receive, from the intention detector 40, the predefined intention 42 of the tokenized utterance 24. At the relation mention detector 60, the processor 12 may be further configured to receive the parse tree 28 from the preprocessor 22. The parse tree 28 may indicate a word dependency structure of the tokenized utterance 24.

Identification of the at least one semantic relation 62 and/or literal relation 63 is discussed in further detail below. The processor 12 may be further configured to identify at least one semantic relation 62 and/or literal relation 63 between the predefined intention 42 and the input ontology entity token 52 based at least in part on the parse tree 28. In one example, the semantic relation 62 and/or literal relation 63 identified by the relation mention detector 60 may be included in a triple including a subject 66A, a predicate 66B, and a direct object 66C. In this example, the input ontology entity token 52 may be the subject 66A, the semantic relation 62 may be the predicate 66B, and an ontology entity 82 with the target ontology entity type 44 indicated by the predefined intention 42 may be the direct object 66C. From the input ontology entity token 52, the semantic relation 62 and/or literal relation 63, and the predefined intention 42, the processor 12 may be further configured to generate a query backbone 64, which may be a graph structure. The query backbone 64 may be generated so as to include at least a portion of the parse tree 28. As discussed in further detail below, the query backbone 64 may be matched to a portion of the knowledge graph 80 in order to select the output ontology entity token 92.

In some embodiments, at least one of the input ontology entity token 52 and the predefined intention 42 may include a respective literal. A literal may be a date, a time, a string, or a numerical value, for example. At the relation mention detector 60, the processor 12 may be further configured to detect a literal relation 63 between the predefined intention 42 and the input ontology entity token 52. In some embodiments, the processor 12 may determine that the predefined intention 42 and the input ontology entity token 52 have a literal relation 63 when the target ontology entity type 44 and/or the input ontology entity type 54 is a numerical type. The relation mention detector 60 may, for example, detect a numerical relation when the tokenized utterance 24 includes a date/time indication 29. In one example, the natural language input 20 may be the sentence "Find some project materials on telecommunications after 2010." When the processor 12 detects a literal relation 63, the processor 12 may apply a keyword-based rule to determine the relation type 88 of the literal relation 63. The processor 12 may identify one or more words or phrases that specify the literal relation 63, such as "before," "after," or "equal to." The processor 12 may then construct the query backbone 64 to have the relation type 88 associated with that literal relation 63. The query backbone 64 may further include the one or more literals based on which the processor 12 detects the literal relation 63.

Figure 2:
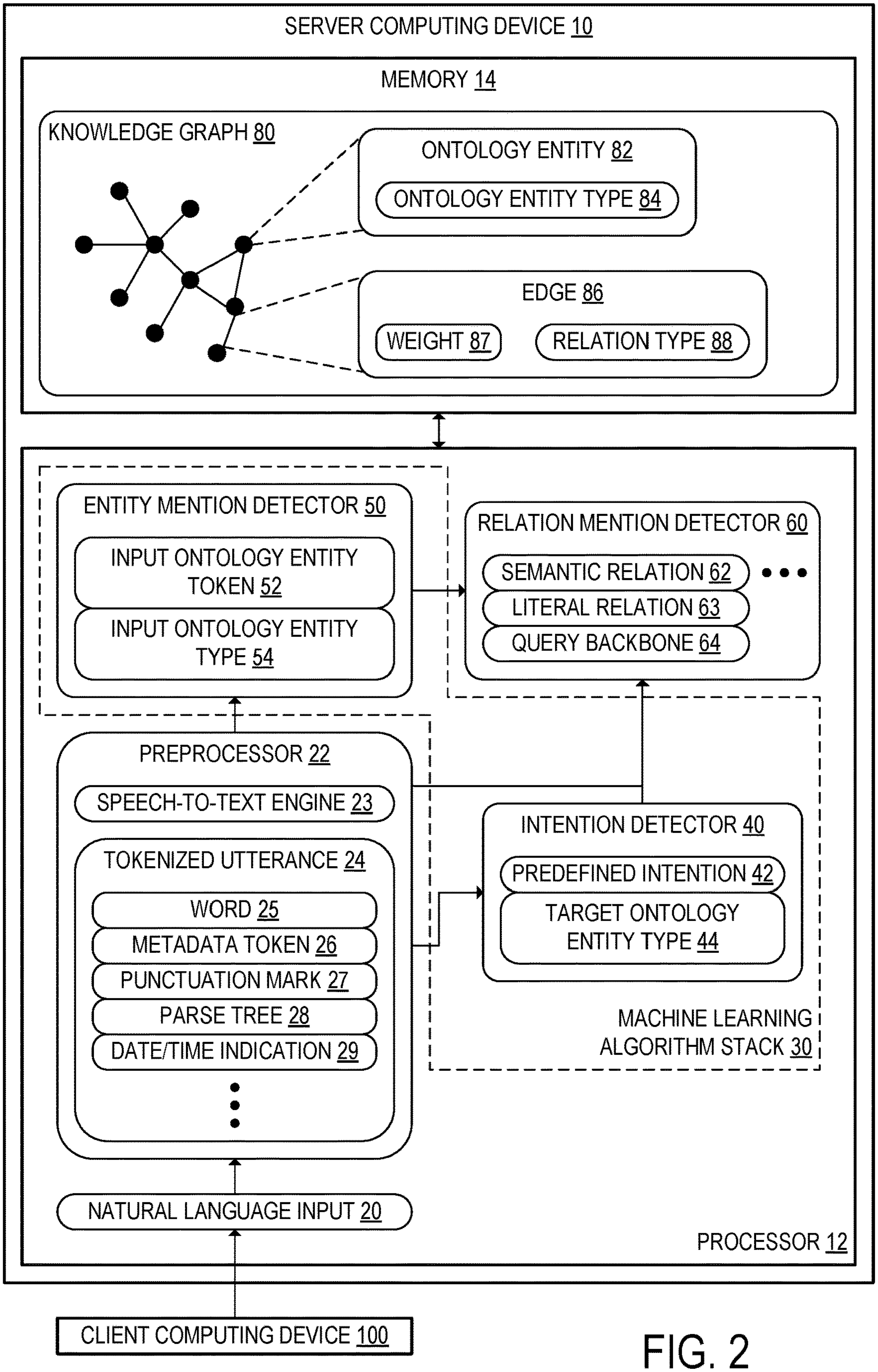
FIG. 2 shows the computing device of FIG. 1 including a processor configured to implement a preprocessor and a machine learning algorithm stack.
Figure 8:
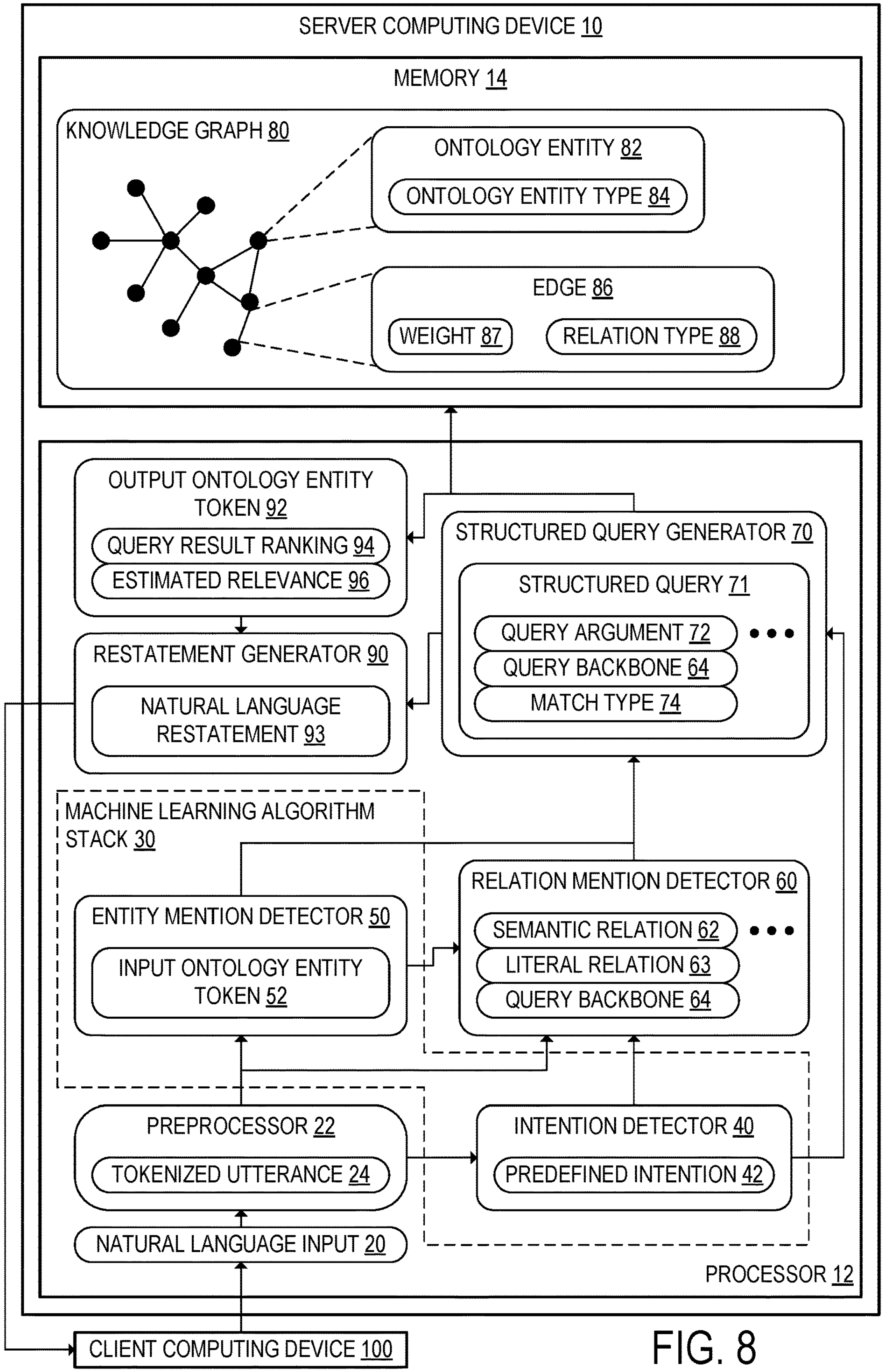
FIG. 8 shows the server computing device of FIG. 2 when the processor generates a structured query and an output ontology entity.

Turning now to FIG. 8, which shows additional components of the computing device 10 of FIG. 2, the processor 12 may be further configured to generate a structured query 71, which may be encoded in a structured query language. Thus, the processor 12 may convert the natural language input 20 into a structured query 71 with which the processor 12 may query the knowledge graph 80. The processor 12 may generate the structured query 71 based on the predefined intention 42 identified by the intention detector 40, the at least one input ontology entity token 52 identified by the entity mention detector 50, and the semantic relation 62 identified by the relation mention detector 60. In some embodiments, the query backbone 64 generated by the relation mention detector 64 may be used as a template for the structured query 71. In such embodiments, the processor 12 may be further configured to generate the structured query 71 at least in part by filling the query backbone 64 with one or more query arguments 72. Each query argument 72 may be a string that is used as a search term. Such strings may be generated by converting the predefined intention 42, the input ontology entity token 52, and/or the semantic relation 62 into strings.

Based on the structured query 71 and the knowledge graph 80, the processor 12 may be further configured to output an output ontology entity token 92 indicating an ontology entity 82 selected from among the plurality of ontology entities 82 included in the knowledge graph 80 and having the target ontology entity type 44 of the predefined intention 42. The processor 12 may select the output ontology entity token 92 by searching the knowledge graph 80 using the structured query 71. This search may include a regular expression search for one or more ontology entities 82 that include respective strings matching the one or more query arguments 72. The query backbone 64 may further specify a match type 74, which may be exact match, dirty match, or synonym match. In some embodiments, the processor 12 may perform a search against the knowledge graph 80 for an exact match for the one or more query arguments 72. In other embodiments, the processor 12 may use synonym matching, in which synonyms of ontology entities 82 indicated by the one or more query arguments 72 are counted as matches. The processor 12 may additionally or alternatively use dirty matching, in which strings that include the one or more query arguments 72 are returned as search results even when the one or more query arguments 72 are embedded within larger strings.

In some embodiments, the processor 12 may identify a plurality of output ontology entity tokens 92 that satisfy the structured query 71. In such embodiments, the processor 12 may be further configured to determine a query result ranking 94 of the plurality of output ontology entity tokens 92. The processor 12 may be configured to determine an estimated relevance 96 for each output ontology entity token 92 and may rank the plurality of output ontology entity tokens 92 in order of estimated relevance. In such embodiments, the estimated relevance 96 of each output ontology entity token 92 may be determined based on the weights 87 included in the knowledge graph 80. The output ontology entity token 92 that is highest in the query result ranking 94 may be selected for output to the user.

Figure 9:
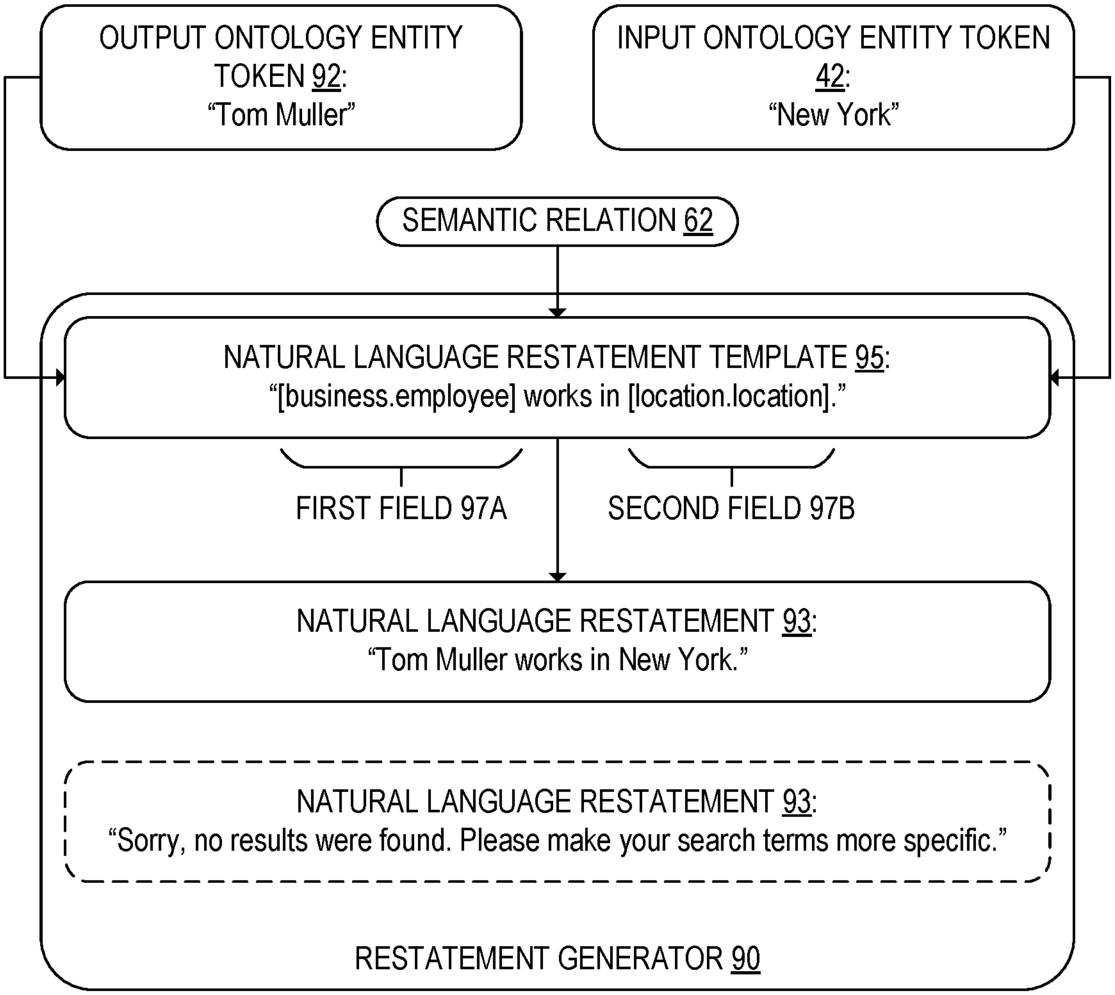
FIG. 9 shows an example restatement generator, according to the embodiment of FIG. 8.

When the server computing device 10 outputs the output ontology entity token 92, the output ontology entity token 92 may be transmitted from the server computing device 10 to the client computing device 100. In order to output the output ontology entity token 92 in a form in which the user of the client computing device 100 can more easily access and comprehend the output ontology entity token 92, the processor 12 of the server computing device 10 may convert the output ontology entity token 92 into a user-accessible form at a restatement generator 90. An example restatement generator 90 is shown in FIG. 9. In the example of FIG. 9, the processor 12 generates a natural language restatement 93 that is a response to the natural language query 20 "Find experts who work in New York and know about machine learning" from FIG. 3. The restatement generator 90 may convert the output ontology entity token 92 into a natural language restatement 93, which may include one or more of text and speech. The processor 12 may be further configured to transmit the natural language restatement 93 to the client computing device 100.

Generating the natural language restatement 93 may include entering the one or more output ontology entity tokens 92 into a natural language restatement template 95. The natural language restatement template 95 may include one or more fields respectively configured to be filled with the one or more output ontology entity tokens 92, along with one or more other words that form one or more natural language sentences around the one or more fields. One or more fields included in the natural language restatement template may additionally or alternatively be filled with one or more respective ontology entities 82 detected by the entity mention detector 50 and/or one or more respective semantic relations 62 identified by the relation mention detector 60. Each field may have an indicated ontology entity type 84. In the example of FIG. 9, the natural language restatement template 95 states, "[business.employee] works in [location.location]." The first field 97A, "[business.employee]," is filled with the output ontology entity token 92 "Tom Muller." The second field 97B, "[location.location]," is filled with the input ontology entity token 52 "New York."

Natural language searches performed by the user of the client computing device 100 may sometimes return no results. For example, the processor 12 may determine that the target ontology entity type 44 of the natural language input 20 used to generate the structured query 71 has no instances that occur in the knowledge graph 80. As another example, the processor 12 may determine that a natural language input 20 such as "Find me projects" provides too little information with which to conduct a search. As another example, the processor 12 may determine that the user does not have permission to access an output ontology entity token 92 or target ontology entity type 44, such as when the user enters the natural language input 20 "Find me Tom Muller's password." When a natural language search returns no results, the processor 12 may output a natural language restatement 93 indicating that no search results were found. Such a natural language restatement 93 may further indicate a reason why no results were found. As one example, the natural language restatement 93 may state, "Sorry, no results were found. Please make your search terms more specific."

Figure 10:
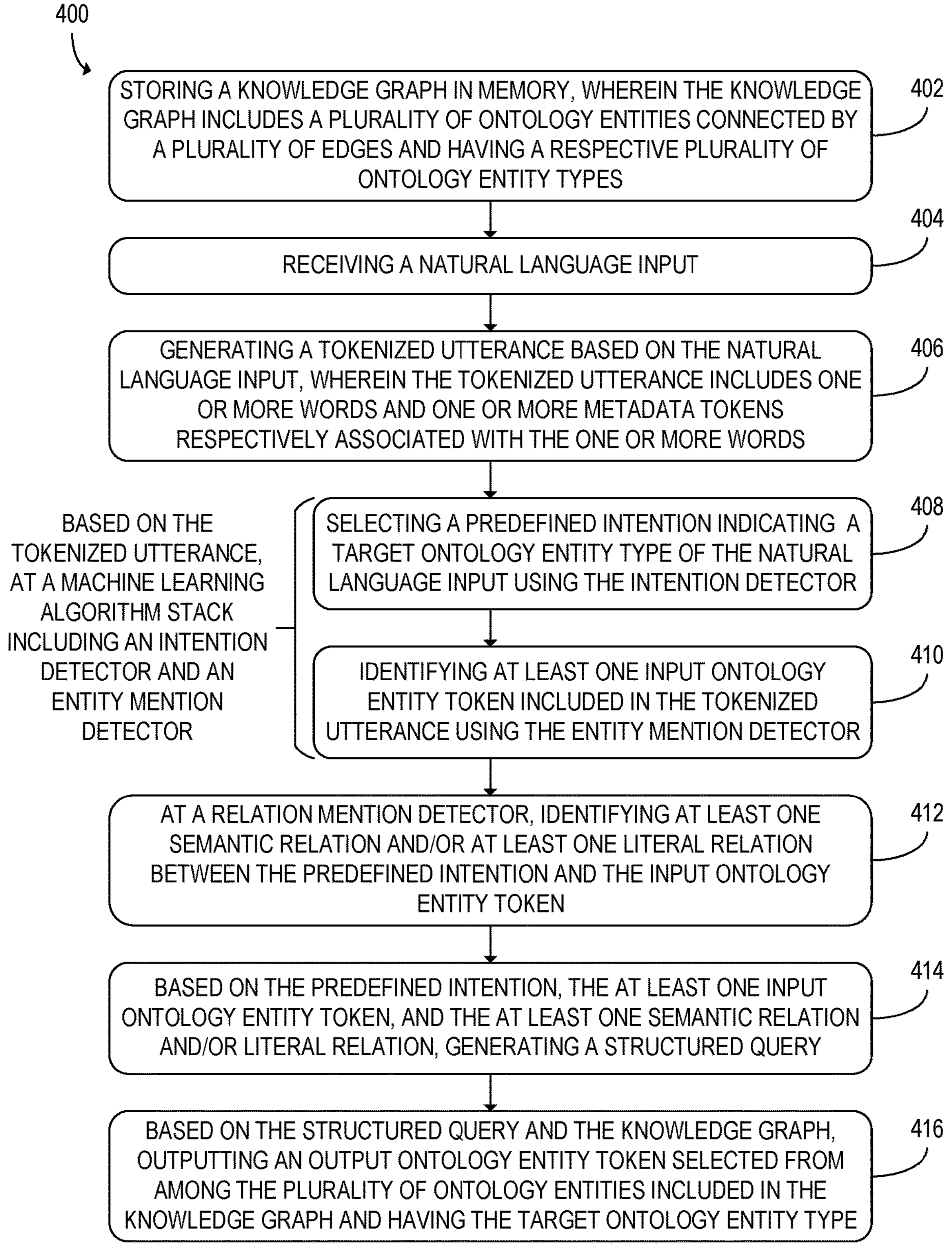
FIG. 10 shows a flowchart of a method that may be performed at a server computing device, according to the embodiment of FIG. 1.

FIG. 10 shows a flowchart of a method 400 for use with a server computing device, which may be the server computing device 10 of FIG. 1 or may alternatively be some other server computing device. At step 402, the method 400 may include storing a knowledge graph in memory. The knowledge graph may include a plurality of ontology entities connected by a plurality of edges and having a respective plurality of ontology entity types. The ontology entities included in the knowledge graph may be words and/or or phrases and may have respective ontology entity types. In some embodiments, each edge of the knowledge graph may further indicate a relation type of the ontology entities which it connects. In some embodiments, the knowledge graph may be a weighted graph in which the plurality of edges have respective weights. Alternatively, the weights may be associated with the ontology entities.

At step 404, the method 400 may further include receiving a natural language input. The natural language input may be selected from the group consisting of audio input and text input. Other types of input, such as one or more images, may be further included in the natural language input. The natural language input may be received by a processor of the server computing device.

At step 406, the method 400 may further include generating a tokenized utterance based on the natural language input. The tokenized utterance may include one or more words and one or more metadata tokens respectively associated with the one or more words. The tokenized utterance may be generated at a preprocessor, which may be a module executed by the processor. The preprocessor may include a speech-to-text engine configured to convert a speech input into text form. In some embodiments, the respective metadata token associated with each word included in the tokenized utterance may indicate a part of speech of that word. A word's metadata token may further indicate a case (uppercase or lowercase) of each letter in that word. Additionally or alternatively, the tokenized utterance may further include one or more punctuation marks. In embodiments in which the tokenized utterance includes one or more punctuation marks, the preprocessor may select the one or more punctuation marks for inclusion in the tokenized utterance at the speech-to-text engine when converting the natural language input into text form. The tokenized utterance may further include at least one date/time indication identified as occurring in the natural language input.

After the tokenized utterance is generated, the method 400 may further include steps that occur at a machine learning algorithm stack including an intention detector and an entity mention detector. The intention detector and the entity mention detector may be machine learning algorithms. In addition, the method 400 may further include one or more steps that are performed at a relation mention detector, which may be an ontology-based graph search algorithm. These steps may be performed based on the tokenized utterance, which may be used as an input for the intention detector, the entity mention detector, and the relation mention detector. At step 408, the method 400 may further include generating a predefined intention indicating a target ontology entity type of the natural language input using the intention detector. The target ontology entity type may be the type of ontology entity for which the user is performing a search.

At step 410, the method 400 may further include identifying at least one input ontology entity token included in the tokenized utterance using the entity mention detector. Each input ontology entity token detected by the entity mention detector may be associated with at least one word of the one or more words included in the tokenized utterance. The entity mention detector may further determine an input ontology entity type of each input ontology entity it detects.

At step 412, the method 400 may further include, at a relation mention detector, identifying at least one semantic relation and/or at least one literal relation between the predefined intention and the input ontology entity token. At step 414, the method 400 may further include generating a structured query based on the target ontology entity type, the at least one input ontology entity, and the semantic relation.

Step 414 may include generating a query backbone from the input ontology entity token, the predefined intention, and the at least one semantic relation and/or literal relation. In some embodiments, the input ontology entity token may be a subject, the semantic relation may be a predicate, and an ontology entity with the target ontology entity type may be a direct object, thus forming a triple that may be used as a query backbone when querying the knowledge graph. In embodiments in which the method 400 includes generating a query backbone, the structured query may be generated by filling one or more fields in the query backbone with one or more query arguments. In such embodiments, the one or more query arguments may be strings that indicate the predefined intention, the at least one input ontology entity token, and the at least one semantic relation and/or literal relation. The structured query may be used as an input with which to query the knowledge graph.

At step 416, the method 400 may further include, based on the structured query and the knowledge graph, outputting an output ontology entity selected from among the plurality of ontology entities included in the knowledge graph and having the target ontology entity type. The output ontology entity may be selected when querying the knowledge graph with the structured query at least in part by identifying a portion of the knowledge graph that matches the query backbone. This portion may be identified via string matching, for example regular expression matching. The output ontology entity token may be output as a string.

Figure 11A:
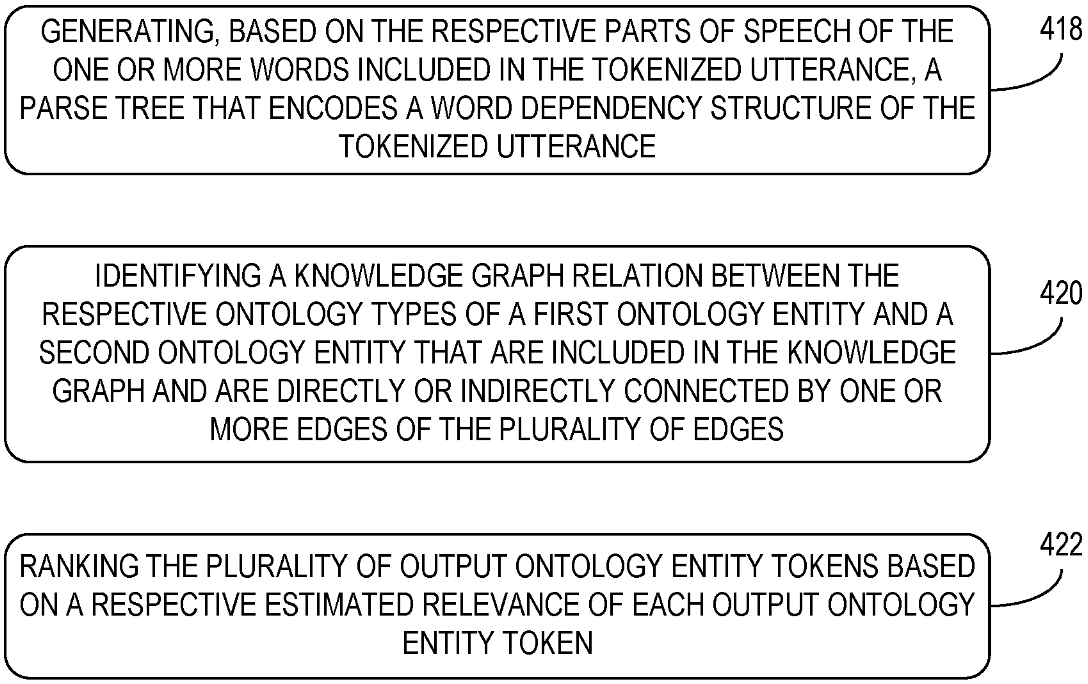
FIGS. 11A-11B show additional steps that may optionally be performed when performing the method of FIG. 10.

FIG. 11A shows additional steps of the method 400 that may be performed in some embodiments. In embodiments in which the respective metadata token associated with each word included in the tokenized utterance indicates a part of speech of that word, the method 400 may further include, at step 418, generating a parse tree. The parse tree may be generated based on the respective parts of speech of the one or more words included in the tokenized utterance and may encode a word dependency structure of the tokenized utterance. The structure of the parse tree may be used when generating the query backbone.

Additionally or alternatively, in some embodiments, selecting the output ontology entity at step 416 may further include, at step 420, identifying a knowledge graph relation between the respective ontology types of a first ontology entity and a second ontology entity that are included in the knowledge graph. The first ontology entity and the second ontology entity may be directly or indirectly connected by one or more edges of the plurality of edges. When the first ontology entity and the second ontology entity are indirectly connected, there are one or more intervening ontology entities located between the first ontology entity and the second ontology entity.

In some embodiments, the output ontology entity token may be included in a plurality of output ontology entity tokens selected when searching the knowledge graph using the structured query. In such embodiments, at step 422, the method 400 may further include ranking the plurality of output ontology entity tokens based on a respective estimated relevance of each output ontology entity token. For example, when the knowledge graph is a weighted graph, the estimated relevance of each output ontology entity token may be determined based on the weights included in the knowledge graph. The output ontology entity token that is output to the user may be the output ontology entity token with the highest rank.

Figure 11B:
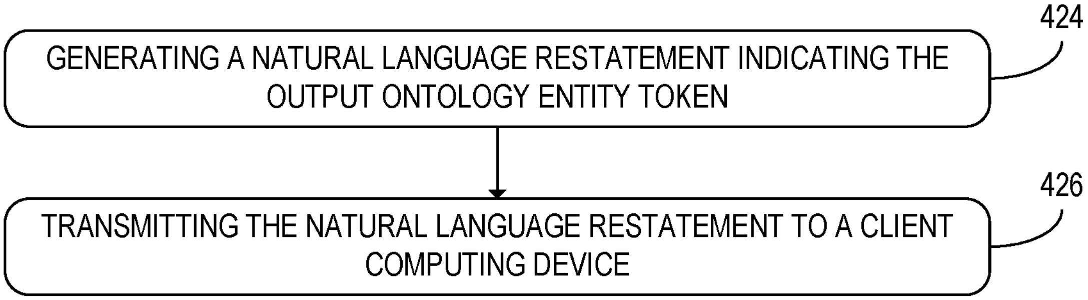

FIG. 11B includes additional steps of the method 400 that may be performed following step 416. The steps of FIG. 11B may be performed at a restatement engine, which may be a module executed by the processor of the server computing device. At step 424, the method 400 may further include generating a natural language restatement indicating the output ontology entity token. Generating the natural language restatement may include entering the one or more output ontology entity tokens generated at step 416 into a natural language restatement template. The natural language restatement may include text and/or speech. At step 426, the method 400 may further include transmitting the natural language restatement to a client computing device. The client computing device to which the natural language restatement is transmitted may be a client computing device from which the natural language input was received.

Searching the knowledge graph with the structured query may sometimes return no results. In such instances, instead of outputting a natural language restatement that indicates one or more output ontology entities, the method may instead include outputting a natural language restatement indicating that the search returned no results. This natural language restatement may be transmitted to the client computing device.

Figure 12:
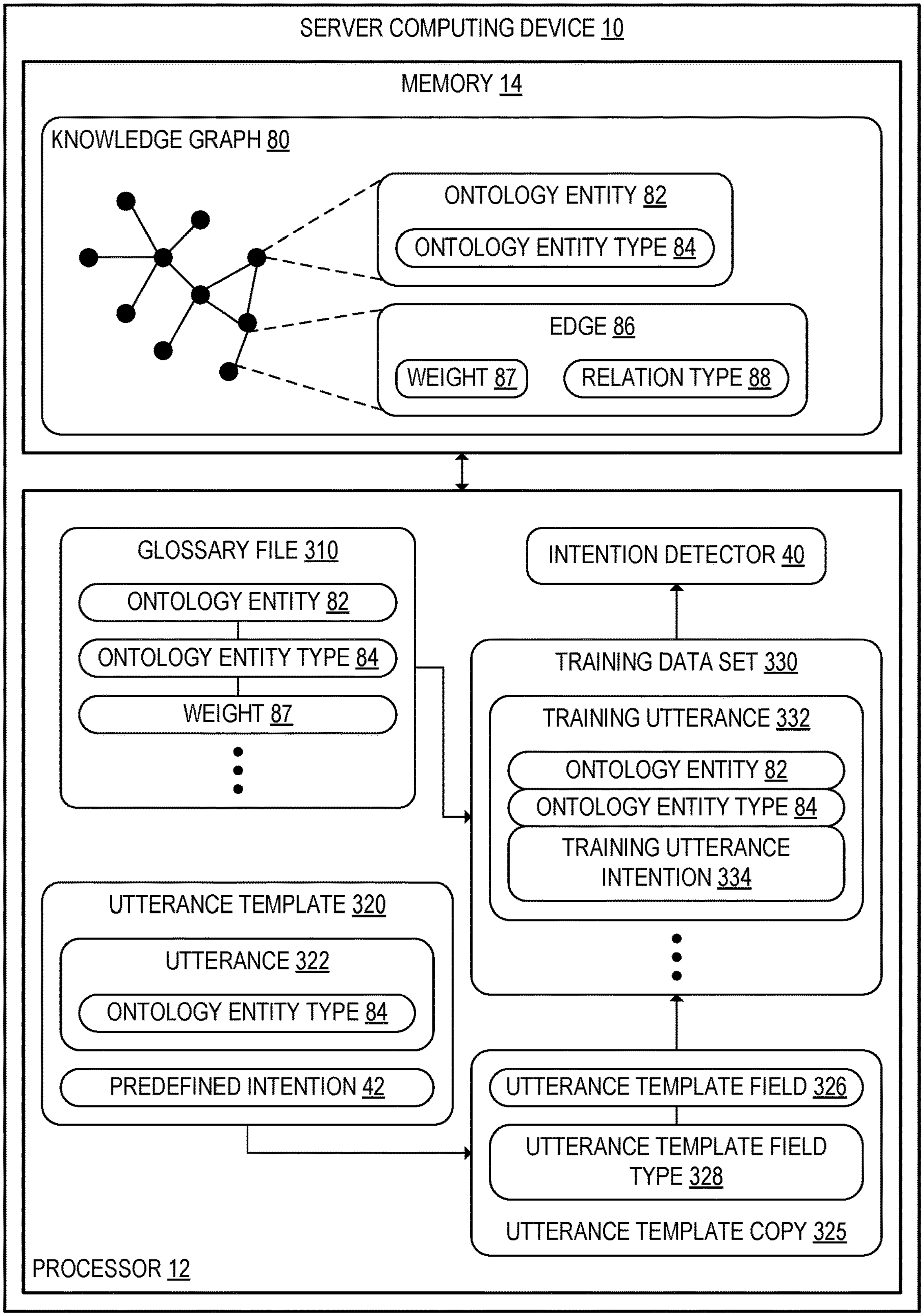
FIG. 12 shows the server computing device of FIG. 2 at a training phase for an intention detector.

FIG. 12 shows the computing device 10 during training of the intention detector 40, according to one example embodiment. As discussed above, the intention detector 40 may include a first bidirectional LSTM network 212 and a second bidirectional LSTM network 214. The systems and methods for training the intention detector 40 as described below may be used to train one or both of the first bidirectional LSTM network 212 and the second bidirectional LSTM network 214. In the example of FIG. 12, the processor 12 is further configured to generate a glossary file 310 based on the knowledge graph 80. The glossary file 310 may include a plurality of the ontology entities 82 included in the knowledge graph 80 and may further include a respective ontology entity type 84 of each ontology entity 82 of the plurality of ontology entities 82. In embodiments in which each ontology entity 82 included in the knowledge graph 80 has a respective weight 87, the glossary file 310 may further include the weight 87 of each ontology entity 82. Thus, the glossary file 310 may summarize at least a portion of the knowledge graph 80.

The processor 12 may be further configured to receive a plurality of utterance templates 320. Each utterance template 320 may include an utterance 322 and a predefine intention 42 associated with that utterance 322. The utterance 322 may include a plurality of ontology entities 82. In addition, in some embodiments, each utterance template 320 may further indicate one or more ontology entity types 84 included in its respective utterance 322. In such embodiments, the one or more ontology entity types 84 included in the utterance 322 may be selected from the plurality of ontology entity types 84 included in the knowledge graph 80. The predefine intention 42 may indicate an example target ontology entity type 44, and the utterance 322 may be an example of a natural language input 20 or tokenized utterance 24.

The utterance template 320 may be used as an example from which a plurality of training utterances 332 and training utterance intentions 334 included in a training data set 330 may be generated, as discussed below. For each utterance template 320, the processor 12 may be further configured to generate one or more utterance template copies of that utterance template 320 in which one or more ontology entities 82 included in the utterance 322 of that utterance template 320 are replaced with utterance template fields 326. Each utterance template field 326 may have an associated utterance template field type 328 indicating a type of ontology entity 82 with which that utterance template field 326 may be filled.

The processor 12 may be further configured to generate the plurality of training utterances 332 at least in part by filling the one or more utterance template fields 326 of the one or more utterance template copies 325 with respective ontology entities 82 included in the glossary file 310. The ontology entities 82 from the glossary file 310 with which the one or more utterance template fields 326 are filled may have the one or more respective ontology entity types 84 associated with the one or more utterance template fields 326. Thus, the processor 12 may generate a training data set 330 of training utterances 332 that are similar to the examples provided in the plurality of utterance templates 320. Each training utterance 332 may further include a training utterance intention selected from among the respective plurality of predefined intentions 42 included in the plurality of utterance templates 320. The processor 12 may be configured to generate a large number of training utterances 332 from each utterance template 320.

FIG. 13 shows a plurality of example utterance templates 320. Each example utterance template 320 shown in FIG. 13 includes an utterance 322 and a predefined intention 42. Example predefined intentions shown in FIG. 13 include "Find_Projects," "Find_Experts," "Send_Email," "Show_Timesheet," "Show_Digest," and "Show_Calendar." Some of the utterances 322 shown in FIG. 13 include one or more utterance template fields 326. FIG. 13 also shows the example utterance 322 "Show me my daily digest," which does not include an utterance template field 326. When an utterance 322 does not include an utterance template field 326, the processor 12 may treat the utterance 322 as a complete training utterance 332 and may include the utterance 322 in the training data set 330.

Returning to FIG. 12, the processor 12 may be further configured to train the intention detector 40 using the plurality of training utterances 332. Since number of training utterances 332 the training data set 330 may be much larger (e.g. 100 or 1000 times larger) than the number of utterances 322 used to form the plurality of utterance templates 320, the processor 12 may train the intention detector 40 with much less human-generated training data than would otherwise be required.

Figure 14:
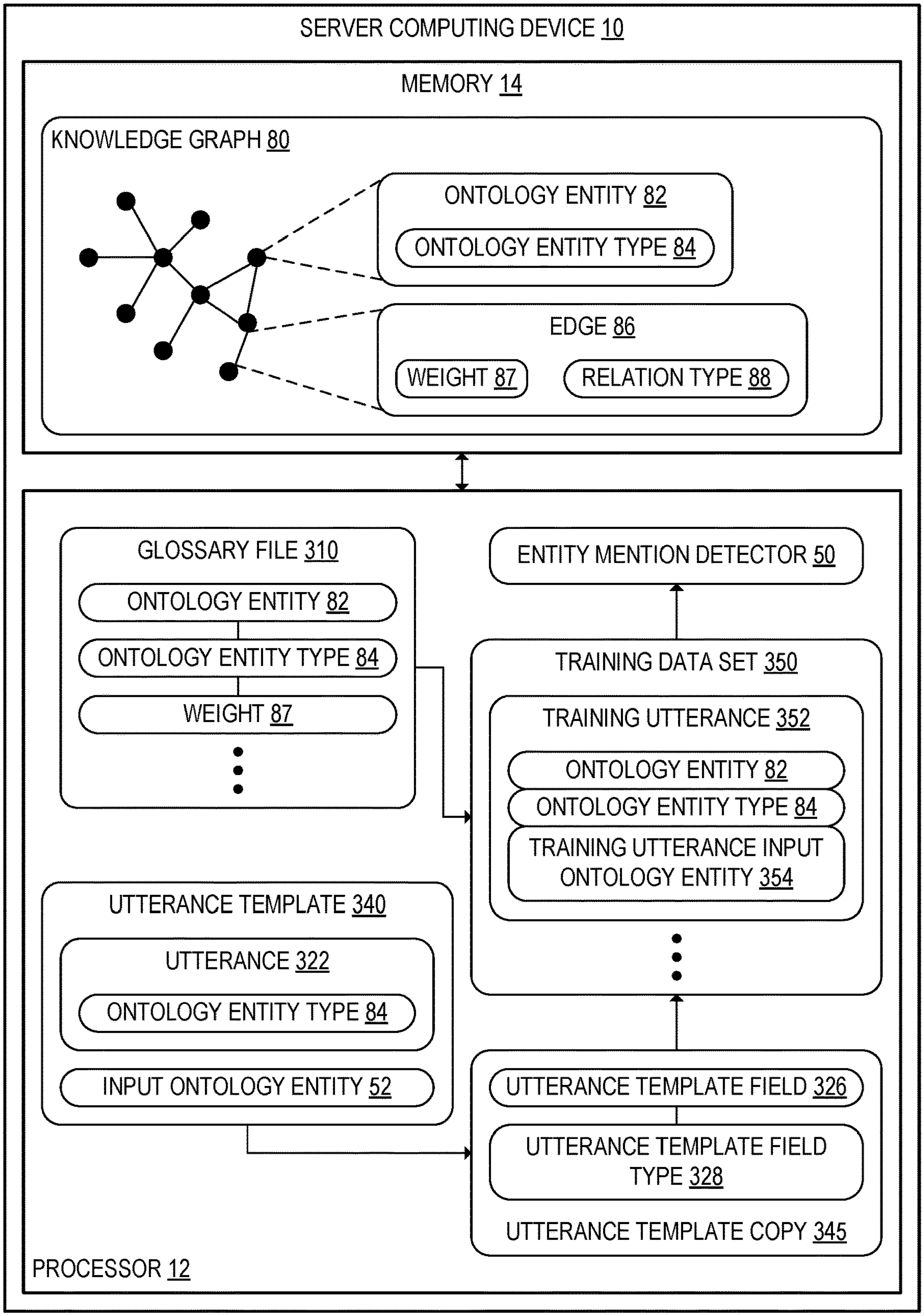
FIG. 14 shows the server computing device of FIG. 2 at a training phase for an entity mention detector.

FIG. 14 shows the server computing device 10 of FIG. 2 during training of the entity mention detector 50. The entity mention detector 50 may include a first bidirectional LSTM network 232 and a second bidirectional LSTM network 234. The systems and methods for training the entity mention detector 50 as described below may be used to train one or both of the first bidirectional LSTM network 232 and the second bidirectional LSTM network 234. In the example of FIG. 14, the processor 12 is further configured to receive a plurality of utterance templates 340, wherein each utterance template 340 includes an utterance 322 and an input ontology entity token 52 associated with that utterance 322. Each utterance template copy 345 shown in FIG. 14 may be generated from an utterance template 340 as described above with reference to FIG. 12. The processor 12 may be further configured to generate a training data set 350 including a plurality of training utterances 352. Whereas each training utterance 332 of FIG. 12 may include a respective training utterance intention 334, each training utterance 352 of FIG. 14 may include a training utterance input ontology entity 354. Each training utterance input ontology entity 352 may be selected from among the respective plurality of input ontology entity tokens 52 included in the plurality of utterance templates 340. The processor 12 may be further configured to train the entity mention detector 50 using the plurality of training utterances 350.

Figure 15:
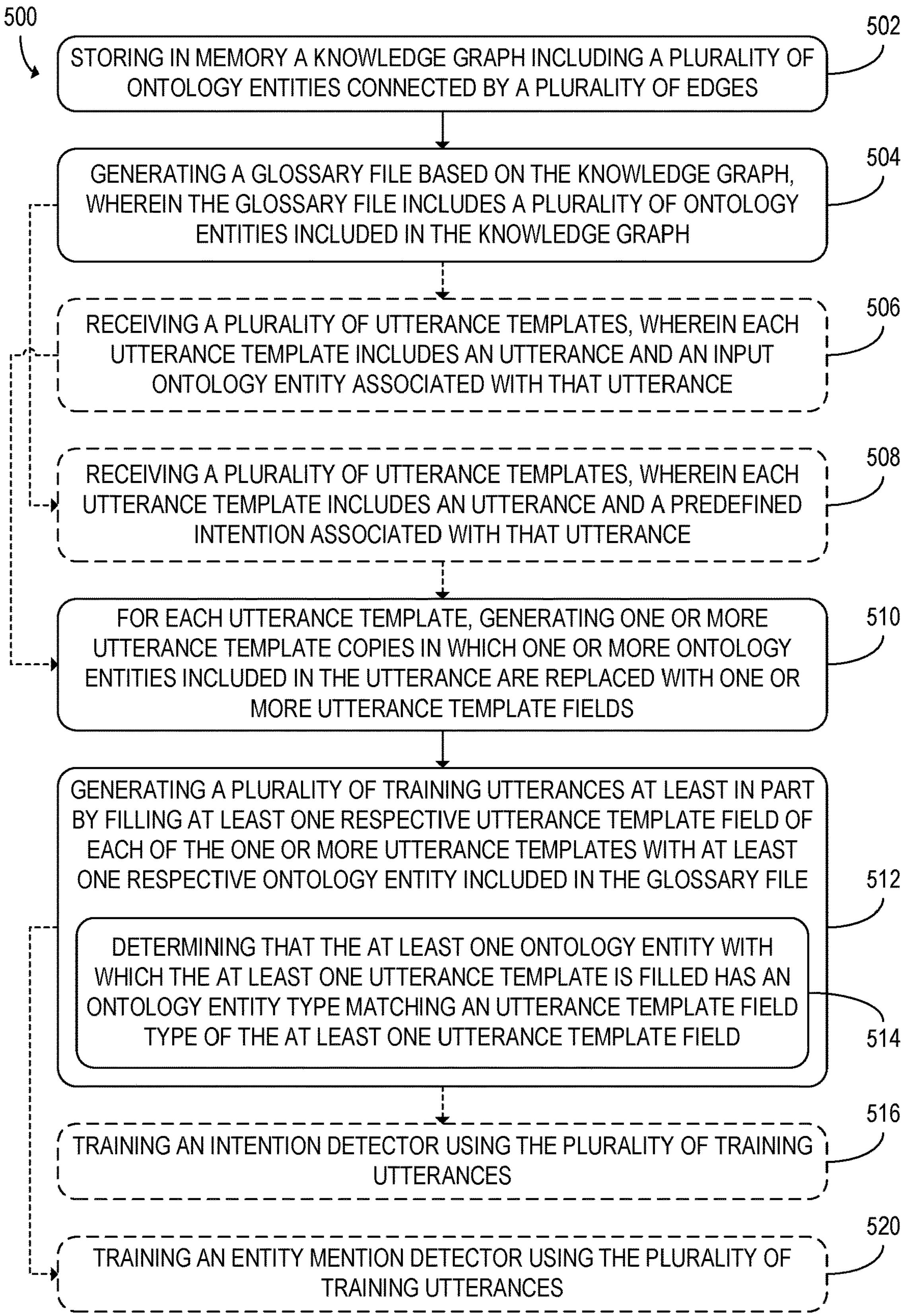
FIG. 15 shows a flowchart of a method that may be performed at a server computing device, according to the embodiment of FIG. 12.

FIG. 15 shows a flowchart of an example method 500 that may be used with a server computing device to train an intention detector or an entity mention detector. The server computing device may be the server computing device 10 of FIG. 2. At step 502, the method 500 may include storing in memory a knowledge graph including a plurality of ontology entities connected by a plurality of edges. In some embodiments, the ontology entities or the edges may have respective weights, for example, in-degree or out-degree weights associated with the ontology entities. At step 504, the method 500 may further include generating a glossary file based on the knowledge graph. The glossary file may include a plurality of ontology entities included in the knowledge graph. In embodiments in which the ontology entities included in the knowledge graph have respective weights, the weights may be included in the glossary file. Additionally or alternatively, the glossary file may further include a respective ontology entity type of each ontology entity of the plurality of ontology entities it includes.

At step 506, the method 500 may further include receiving a plurality of utterance templates. Each utterance template may include an utterance and an input ontology entity associated with that utterance. Alternatively, as shown at step 508, each utterance template may include an utterance and a predefined intention associated with that utterance. The respective utterance included in each utterance template may be a natural language utterance or may alternatively be a tokenized utterance. In some embodiments, each utterance template may further indicate one or more ontology entity types included in its respective utterance.

The method 500 may further include, at step 510, generating one or more utterance template copies for each utterance template. In each utterance template copy, one or more ontology entities included in the utterance may be replaced with one or more utterance template fields. The one or more utterance template fields may have utterance template field types matching the respective ontology entity types of the ontology entities with which they were replaced. Thus, the utterance template fields may be filled with ontology entities having the same ontology entity types. At step 512, the method 500 may further include generating a plurality of training utterances at least in part by filling the utterance template fields of the one or more utterance template copies with respective ontology entities included in the glossary file. Thus, training utterances similar to the utterances included in the utterance template may be programmatically generated without having to be hand-generated by a user. Step 512 may include, at step 514, determining that the at least one ontology entity with which the at least one utterance template is filled has an ontology entity type matching an utterance template field type of the at least one utterance template field.

At step 516, in embodiments in which step 506 is performed, the method 500 may further include training an intention detector using the plurality of training utterances. Alternatively, in embodiments in which step 508 is performed, the method 500 may further include, at step 518, training an entity mention detector using the plurality of training utterances. The intention detector and/or the entity mention detector may include at least one bidirectional LSTM.

In some embodiments, the methods and processes described herein may be tied to a computing system of one or more computing devices. In particular, such methods and processes may be implemented as a computer-application program or service, an application-programming interface (API), a library, and/or other computer-program product.

Figure 16:
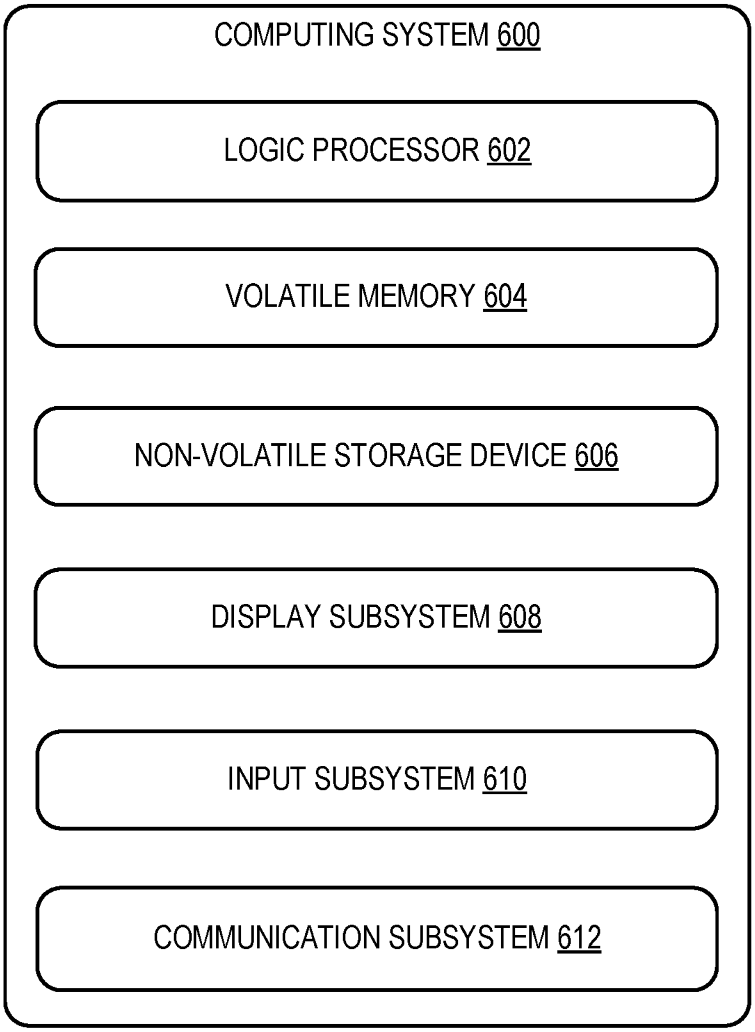
FIG. 16 shows a schematic view of an example computing environment in which the computer device of FIG. 1 may be enacted.

FIG. 16 schematically shows a non-limiting embodiment of a computing system 600 that can enact one or more of the methods and processes described above. Computing system 600 is shown in simplified form. Computing system 600 may embody the server computing device 10 described above and illustrated in FIG. 2. Computing system 600 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 16.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

According to one aspect of the present disclosure, a server computing device is provided, including memory storing a knowledge graph including a plurality of ontology entities connected by a plurality of edges and having a respective plurality of ontology entity types. The server computing device may further include a processor configured to receive a natural language input. The processor may be further configured to generate a tokenized utterance based on the natural language input. The tokenized utterance may include one or more words and one or more metadata tokens respectively associated with the one or more words. Based on the tokenized utterance, at a machine learning algorithm stack including an intention detector and an entity mention detector, the processor may be further configured to select a predefined intention indicating a target ontology entity type of the natural language input using the intention detector. The processor may be further configured to identify at least one input ontology entity token included in the tokenized utterance using the entity mention detector. At a relation mention detector, the processor may be further configured to identify at least one semantic relation and/or at least one literal relation between the predefined intention and the input ontology entity token. Based on the predefined intention, the at least one input ontology entity token, and the at least one semantic relation and/or literal relation, the processor may be further configured to generate a structured query. Based on the structured query and the knowledge graph, the processor may be further configured to output an output ontology entity token selected from among the plurality of ontology entities included in the knowledge graph and having the target ontology entity type.

According to this aspect, the at least one input ontology entity token may be associated with at least one word of the one or more words included in the tokenized utterance.

According to this aspect, the respective metadata token associated with each word included in the tokenized utterance may indicate a part of speech of that word.

According to this aspect, the processor may be further configured to generate, based on the respective parts of speech of the one or more words included in the tokenized utterance, a parse tree that encodes a word dependency structure of the tokenized utterance.

According to this aspect, the processor may be further configured to generate a natural language restatement indicating the output ontology entity token. The processor may be further configured to transmit the natural language restatement to a client computing device.

According to this aspect, the output ontology entity token may be included in a plurality of output ontology entity tokens. The processor may be further configured to rank the plurality of output ontology entity tokens based on a respective estimated relevance of each output ontology entity token.

According to this aspect, each edge of the knowledge graph may have a respective weight.

According to this aspect, each edge of the knowledge graph may further indicate a relation type of the ontology entities which it connects.

According to this aspect, the processor may be further configured to select the output ontology entity token at least in part by identifying a knowledge graph relation between the respective ontology types of a first ontology entity and a second ontology entity that are included in the knowledge graph and are directly or indirectly connected by one or more edges of the plurality of edges.

According to this aspect, the natural language input may be selected from the group consisting of audio input and text input.

According to this aspect, the tokenized utterance may include one or more punctuation marks.

According to another aspect of the present disclosure, a method for use with a server computing device is provided. The method may include storing a knowledge graph in memory. The knowledge graph may include a plurality of ontology entities connected by a plurality of edges and having a respective plurality of ontology entity types. The method may further include receiving a natural language input. The method may further include generating a tokenized utterance based on the natural language input. The tokenized utterance may include one or more words and one or more metadata tokens respectively associated with the one or more words. Based on the tokenized utterance, at a machine learning algorithm stack including an intention detector and an entity mention detector, the method may further include selecting a predefined intention indicating a target ontology entity type of the natural language input using the intention detector. The method may further include identifying at least one input ontology entity token included in the tokenized utterance using the entity mention detector. The method may further include, at a relation mention detector, identifying at least one semantic relation and/or at least one literal relation between the predefined intention and the input ontology entity token. Based on the predefined intention, the at least one input ontology entity token, and the at least one semantic relation and/or literal relation, the method may further include generating a structured query. Based on the structured query and the knowledge graph, the method may further include outputting an output ontology entity token selected from among the plurality of ontology entities included in the knowledge graph and having the target ontology entity type.

According to this aspect, the at least one input ontology entity token may be associated with at least one word of the one or more words included in the tokenized utterance.

According to this aspect, the respective metadata token associated with each word included in the tokenized utterance may indicate a part of speech of that word.

According to this aspect, the method may further include generating a natural language restatement indicating the output ontology entity token. The method may further include transmitting the natural language restatement to a client computing device.

According to this aspect, the output ontology entity token may be included in a plurality of output ontology entity tokens. The method may further include ranking the plurality of output ontology entity tokens based on a respective estimated relevance of each output ontology entity token.

According to this aspect, each edge of the knowledge graph may further indicate a relation type of the ontology entities which it connects.

According to this aspect, selecting the output ontology entity token may include identifying a knowledge graph relation between the respective ontology types of a first ontology entity and a second ontology entity that are included in the knowledge graph and are directly or indirectly connected by one or more edges of the plurality of edges.

According to this aspect, the tokenized utterance may include one or more punctuation marks.

According to another aspect of the present disclosure, a server computing device is provided, including memory storing a knowledge graph including a plurality of ontology entities having a respective plurality of ontology entity types. The server computing device may further include a processor configured to receive a natural language input. The processor may be further configured to, at a preprocessor, generate a tokenized utterance based on the natural language input. The tokenized utterance may include one or more words identified in the natural language input, one or more punctuation marks, one or more metadata tokens respectively associated with the one or more words, and a parse tree that encodes a word dependency structure of the tokenized utterance. Based on the tokenized utterance, at a machine learning algorithm stack including an intention detector and an entity mention detector, the processor may be further configured to select a predefined intention indicating a target ontology entity type of the natural language input using the intention detector. The processor may be further configured to identify at least one input ontology entity token included in the tokenized utterance using the entity mention detector. The processor may be further configured to, at a relation mention detector, identify at least one semantic relation and/or at least one literal relation between the predefined intention and the input ontology entity token. Based on the predefined intention, the at least one input ontology entity token, and the at least one semantic relation and/or literal relation, the processor may be further configured to generate a structured query. Based on the structured query and the knowledge graph, the processor may be further configured to output an output ontology entity token selected from among the plurality of ontology entities included in the knowledge graph and having the target ontology entity type.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A server computing device, comprising:
memory storing a knowledge graph including a plurality of ontology entities connected by a plurality of edges and having a respective plurality of ontology entity types;
a processor configured to:
receive a natural language input;
generate a tokenized utterance based on the natural language input, wherein the tokenized utterance includes one or more words and one or more metadata tokens respectively associated with the one or more words;
based on the tokenized utterance, at a machine learning algorithm stack including an intention detector and an entity mention detector:
select a predefined intention indicating a target ontology entity type of the natural language input using the intention detector;
identify at least one input ontology entity token included in the tokenized utterance using the entity mention detector; and
at a relation mention detector, identify at least one semantic relation and/or at least one literal relation between the predefined intention and the input ontology entity token;
based on the predefined intention, the at least one input ontology entity token, and the at least one semantic relation and/or literal relation, generate a structured query; and
based on the structured query and the knowledge graph, output an output ontology entity token selected from among the plurality of ontology entities included in the knowledge graph and having the target ontology entity type.

2. The server computing device of claim 1, wherein the at least one input ontology entity token is associated with at least one word of the one or more words included in the tokenized utterance.

3. The server computing device of claim 1, wherein the respective metadata token associated with each word included in the tokenized utterance indicates a part of speech of that word.

4. The server computing device of claim 3, wherein the processor is further configured to generate, based on the respective parts of speech of the one or more words included in the tokenized utterance, a parse tree that encodes a word dependency structure of the tokenized utterance.

5. The server computing device of claim 1, wherein the processor is further configured to:
generate a natural language restatement indicating the output ontology entity token; and
transmit the natural language restatement to a client computing device.

6. The server computing device of claim 1, wherein:
the output ontology entity token is included in a plurality of output ontology entity tokens; and
the processor is further configured to rank the plurality of output ontology entity tokens based on a respective estimated relevance of each output ontology entity token.

7. The server computing device of claim 1, wherein each edge of the knowledge graph has a respective weight.

8. The server computing device of claim 1, wherein each edge of the knowledge graph further indicates a relation type of the ontology entities which it connects.

9. The server computing device of claim 1, wherein the processor is further configured to select the output ontology entity token at least in part by identifying a knowledge graph relation between the respective ontology types of a first ontology entity and a second ontology entity that are included in the knowledge graph and are directly or indirectly connected by one or more edges of the plurality of edges.

10. The server computing device of claim 1, wherein the natural language input is selected from the group consisting of audio input and text input.

11. The server computing device of claim 1, wherein the tokenized utterance includes one or more punctuation marks.

12. A method for use with a server computing device, the method comprising:

storing a knowledge graph in memory, wherein the knowledge graph includes a plurality of ontology entities connected by a plurality of edges and having a respective plurality of ontology entity types;

receiving a natural language input;

generating a tokenized utterance based on the natural language input, wherein the tokenized utterance includes one or more words and one or more metadata tokens respectively associated with the one or more words;

based on the tokenized utterance, at a machine learning algorithm stack including an intention detector and an entity mention detector:

selecting a predefined intention indicating a target ontology entity type of the natural language input using the intention detector;

identifying at least one input ontology entity token included in the tokenized utterance using the entity mention detector; and at a relation mention detector, identifying at least one semantic relation and/or at least one literal relation between the predefined intention and the input ontology entity token;

based on the predefined intention, the at least one input ontology entity token, and the at least one semantic relation and/or literal relation, generating a structured query; and based on the structured query and the knowledge graph, outputting an output ontology entity token selected from among the plurality of ontology entities included in the knowledge graph and having the target ontology entity type.

13. The method of claim 12, wherein the at least one input ontology entity token is associated with at least one word of the one or more words included in the tokenized utterance.

14. The method of claim 12, wherein the respective metadata token associated with each word included in the tokenized utterance indicates a part of speech of that word.

15. The method of claim 12, further comprising:

generating a natural language restatement indicating the output ontology entity token; and transmitting the natural language restatement to a client computing device.

16. The method of claim 12, wherein:

the output ontology entity token is included in a plurality of output ontology entity tokens; and the method further comprises ranking the plurality of output ontology entity tokens based on a respective estimated relevance of each output ontology entity token.

17. The method of claim 12, wherein each edge of the knowledge graph further indicates a relation type of the ontology entities which it connects.

18. The method of claim 12, wherein selecting the output ontology entity token includes identifying a knowledge graph relation between the respective ontology types of a first ontology entity and a second ontology entity that are included in the knowledge graph and are directly or indirectly connected by one or more edges of the plurality of edges.

19. The method of claim 12, wherein the tokenized utterance includes one or more punctuation marks.

20. A server computing device, comprising:

memory storing a knowledge graph including a plurality of ontology entities having a respective plurality of ontology entity types;

a processor configured to:

receive a natural language input;

at a preprocessor, generate a tokenized utterance based on the natural language input, wherein the tokenized utterance includes:

one or more words identified in the natural language input;

one or more punctuation marks;

one or more metadata tokens respectively associated with the one or more words; and a parse tree that encodes a word dependency structure of the tokenized utterance;

based on the tokenized utterance, at a machine learning algorithm stack including an intention detector and an entity mention detector:

select a predefined intention indicating a target ontology entity type of the natural language input using the intention detector;

identify at least one input ontology entity token included in the tokenized utterance using the entity mention detector; and at a relation mention detector, identify at least one semantic relation and/or at least one literal relation between the predefined intention and the input ontology entity token;

based on the predefined intention, the at least one input ontology entity token, and the at least one semantic relation and/or literal relation, generate a structured query; and based on the structured query and the knowledge graph, output an output ontology entity token selected from among the plurality of ontology entities included in the knowledge graph and having the target ontology entity type.

* * * * *